(12) United States Patent
Yanagiuchi et al.

(10) Patent No.: US 11,588,161 B2
(45) Date of Patent: Feb. 21, 2023

(54) FUEL CELL DEVICE (71) Applicants: DAINICHI CO., LTD., Niigata (JP); KYOCERA CORPORATION, Kyoto (JP)

(72) Inventors: Shintaro Yanagiuchi, Niigata (JP); Naoki Yokoo, Niigata (JP); Tomohiro Fukagawa, Niigata (JP); Tomoki Oyanagi, Niigata (JP); Kazuaki Kobayashi, Kirishima (JP)

(73) Assignees: KYOCERA CORPORATION, Kyoto (JP); DAINICHI CO., LTD., Niigata (JP)

( * ) Notice: Subject to any disclaimer, the term of this patent is extended or adjusted under 35 U.S.C. 154(b) by 145 days.

(21) Appl. No.: 16/633,622

(22) PCT Filed: Jul. 17, 2018

(86) PCT No.: PCT/JP2018/026775
§ 371 (c)(1),
(2) Date: Jan. 24, 2020

(87) PCT Pub. No.: WO2019/021892
PCT Pub. Date: Jan. 31, 2019

(65) Prior Publication Data
US 2020/0212463 A1 Jul. 2, 2020

(30) Foreign Application Priority Data

Jul. 27, 2017 (JP) .............................. JP2017-145870

(51) Int. Cl.
*H01M 8/04119* (2016.01)
*C02F 1/42* (2006.01)
(Continued)

(52) U.S. Cl.
CPC ........... *H01M 8/04164* (2013.01); *C02F 1/42* (2013.01); *H01M 8/04022* (2013.01); *H01M 8/0618* (2013.01)

(58) Field of Classification Search
CPC ......... H01M 8/04164; H01M 8/04022; H01M 8/0618; C02F 1/42
See application file for complete search history.

(56) References Cited

U.S. PATENT DOCUMENTS

2009/0130529 A1* 5/2009 Yamamoto ........ H01M 8/04164
429/412
2009/0233134 A1 9/2009 Hobmeyr et al.
(Continued)

FOREIGN PATENT DOCUMENTS

JP 2007257953 A 10/2007
JP 2009009808 A 1/2009
(Continued)

Primary Examiner — Matthew J Merkling
(74) Attorney, Agent, or Firm — Viering, Jentschura & Partner MBB (57) ABSTRACT A fuel cell device may include a fuel cell module; a condensate water recovery flow path which may recover water contained in an exhaust gas discharged from the fuel cell module as condensate water; a condensate water recovery device which may store the condensate water; and a reforming water supply flow path which may supply the condensate water to a reformer. The condensate water recovery device of the fuel cell device may include a first ion exchange container which may contain an ion exchange resin; and a first storage container which may store the condensate water. The first ion exchange container may be disposed inside the first storage container with a space from the first storage container, and may be attachable to and detachable from the first storage container.

17 Claims, 10 Drawing Sheets (51) Int. Cl.
*H01M 8/04014* (2016.01)
*H01M 8/0612* (2016.01)

(56) References Cited

U.S. PATENT DOCUMENTS

| | | | | |
|---|---|---|---|---|
| 2009/0291337 A1* | 11/2009 | Tamura | ................... | C01B 3/48 |
| | | | | 429/412 |
| 2010/0297513 A1* | 11/2010 | Yasuda | ............. | H01M 8/04768 |
| | | | | 429/423 |
| 2012/0107703 A1* | 5/2012 | Yukimasa | ........... | H01M 8/0618 |
| | | | | 429/410 |
| 2012/0135322 A1* | 5/2012 | Yoshimine | ........ | H01M 8/04164 |
| | | | | 429/410 |
| 2012/0219872 A1* | 8/2012 | Tanaka | ................ | H01M 8/0618 |
| | | | | 429/450 |
| 2017/0170504 A1* | 6/2017 | Yoshida | ............ | H01M 8/04029 |
| 2018/0178143 A1* | 6/2018 | Miki | ................ | H01M 8/04291 |

FOREIGN PATENT DOCUMENTS

| | | | |
|---|---|---|---|
| JP | 2012133911 | A | 7/2012 |
| JP | 2012155979 | A | 8/2012 |
| JP | 2013182832 | A | 9/2013 |
| JP | 2016067982 | A | 5/2016 |
| JP | 2016072056 | A | 5/2016 |
| WO | 2013167946 | A1 | 11/2013 |

* cited by examiner

FUEL CELL DEVICE

CROSS-REFERENCE TO RELATED APPLICATIONS

This application is a national stage entry according to 35 U.S.C. 371 of International Application No. PCT/JP2018/026775 filed on Jul. 17, 2018, which claims priority to Japanese Patent Application No. 2017-145870 filed on Jul. 27, 2017, the contents of which are entirely incorporated herein by reference.

TECHNICAL FIELD

The present disclosure relates to a fuel cell device.

BACKGROUND

For the configuration of the fuel cell, a fuel cell module including a cell stack in which a plurality of fuel cells that can obtain electric power using fuel gas (hydrogen-containing gas) and air (oxygen-containing gas) are stacked in a storage container, and a fuel cell device in which the fuel cell module and auxiliary machines for the operation of the fuel cell module are housed in a housing such as an exterior case are variously proposed.

In such a fuel cell device, excess fuel gas that is unused for power generation is combusted, and the exhaust gas after combustion is passed through a heat exchanger or the like to be cooled, and during this heat exchange, condensate water generated by condensation of water vapor contained in the exhaust gas may be recovered in a condensate water recovery device, purified with ion exchange resin, and stored in a water tank such as a reforming water tank, and the stored treated water may be supplied as the reforming water to a reformer that steam-reforms a raw fuel such as natural gas, which may be referred to as a self-sustained water operation.

Japanese Unexamined Patent Publication JP-A 2016-072056 (Patent Literature 1) discusses a condensate water recovery device that may purify condensate water and store it as reforming water, in which a water purifying unit that may store an ion exchange resin, a storage portion that may store the reforming water, and a backflow prevention unit may be integrally molded in a casing.

Japanese Unexamined Patent Publication JP-A 2013-182832 (Patent Literature 2) discusses a water purification device for a fuel cell system, which may include a water purifier including a container which may contain a water purification material (ion exchange resin), and a water tank (reforming water tank) which may store water to be purified by the water purifier, in which the container of the water purifier and the water tank may be connected externally.

SUMMARY

A fuel cell device according to a non-limiting aspect of the disclosure may include a fuel cell module that may include a fuel cell and a reformer which may steam-reform a raw fuel, a condensate water recovery flow path which may recover water contained in an exhaust gas discharged from the fuel cell module as condensate water, a condensate water recovery device which may store the condensate water flowing through the condensate water recovery flow path, and a reforming water supply flow path which may supply the condensate water stored in the condensate water recovery device to the reformer, the condensate water recovery device may include a first ion exchange container which may contain an ion exchange resin, and a first storage container may store the condensate water having passed through the first ion exchange container, the first storage container may be a bottomed container including an upper side opening, the first ion exchange container may be disposed inside the first storage container with a space from the first storage container, and may be attachable to and detachable from the first storage container through the upper side opening.

BRIEF DESCRIPTION OF DRAWINGS

Other and further objects, features, and advantages of the disclosure will be more explicit from the following detailed description taken with reference to the drawings wherein.

DETAILED DESCRIPTION

Hereinafter, non-limiting embodiments will be described in detail with reference to the drawings.

The same configurations are denoted by the same reference numerals, and the description thereof will not be omitted.

FIGS. 1 to 4 are diagrams for explaining a schematic configuration of a fuel cell device according to a first non-limiting embodiment.

Figure 1:
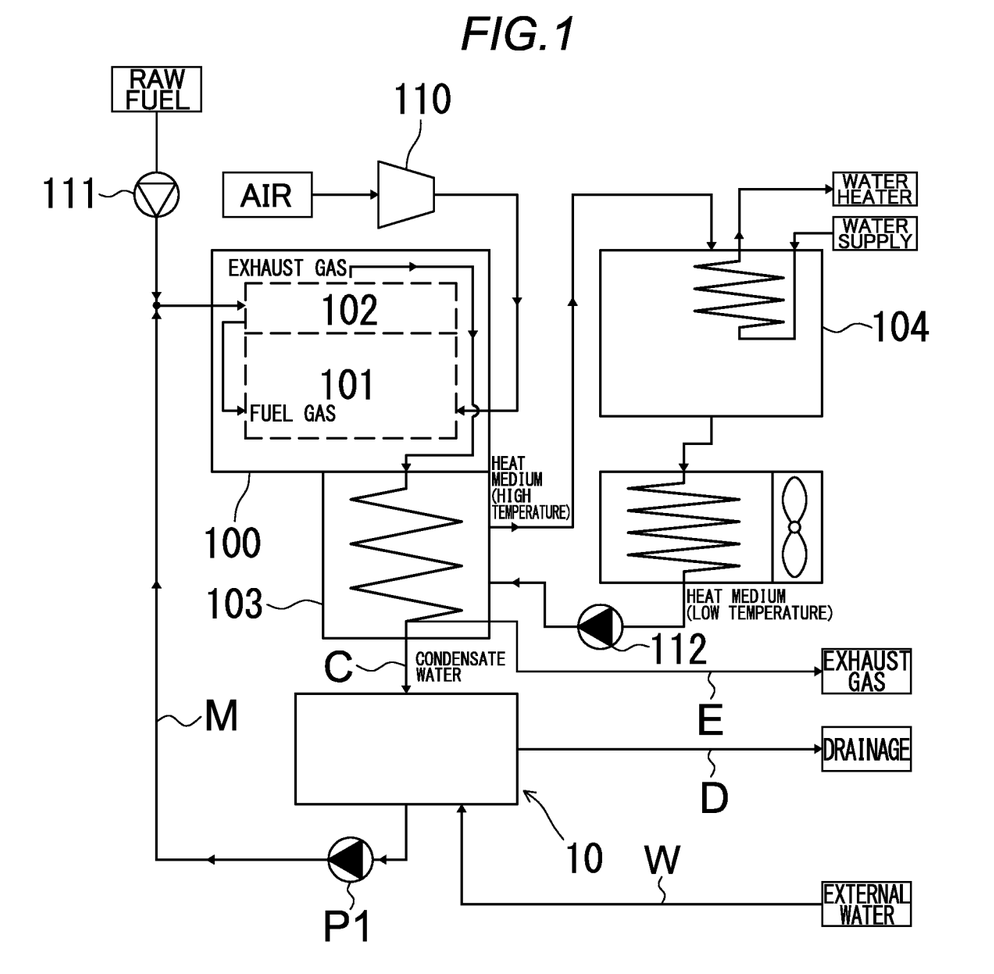
FIG. 1 is a diagram illustrating a schematic configuration of a fuel cell device according to a first non-limiting embodiment.

The fuel cell device according to the non-limiting embodiment performs power supply by the operation of a fuel cell module 100 that generates power using a raw fuel such as natural gas and LP gas and air, and hot water supply by using an exhaust heat recovery system including a heat exchanger 103, a heat storage tank 104, or the like. It can also be operated as the so-called monogeneration system which does not supply hot water.

The fuel cell module 100 includes a cell stack 101 in which a plurality of fuel cells are stacked, and a reformer 102 that performs steam-reforming of a raw fuel using steam. In an exterior case, there are provided an air blower 110 which is a blower that feeds air into the fuel cell module 100, a gas pump 111 that feeds a raw fuel such as natural gas and LPG to the reformer 102, a circulation pump 112 that circulates the heat medium in the exhaust heat recovery system in the closed system, a reforming water pump P1 that supplies the condensate water recovered from the heat exchanger 103 to the reformer 102 as raw water for steam-reforming (hereinafter, reforming water), or the like.

A heat exchanger 103 is disposed adjacent to the fuel cell module 100. In the heat exchanger 103, heat exchange is performed between the exhaust gas discharged from the fuel cell module 100 and the heat medium flowing in the heat exchanger 103, and moisture contained in the exhaust gas is generated as condensate water. The condensate water generated by the heat exchange is supplied to and stored in a condensate water recovery device 10 according to the non-limiting embodiment, which will be described below, through a condensate water recovery flow path C.

Figure 2:
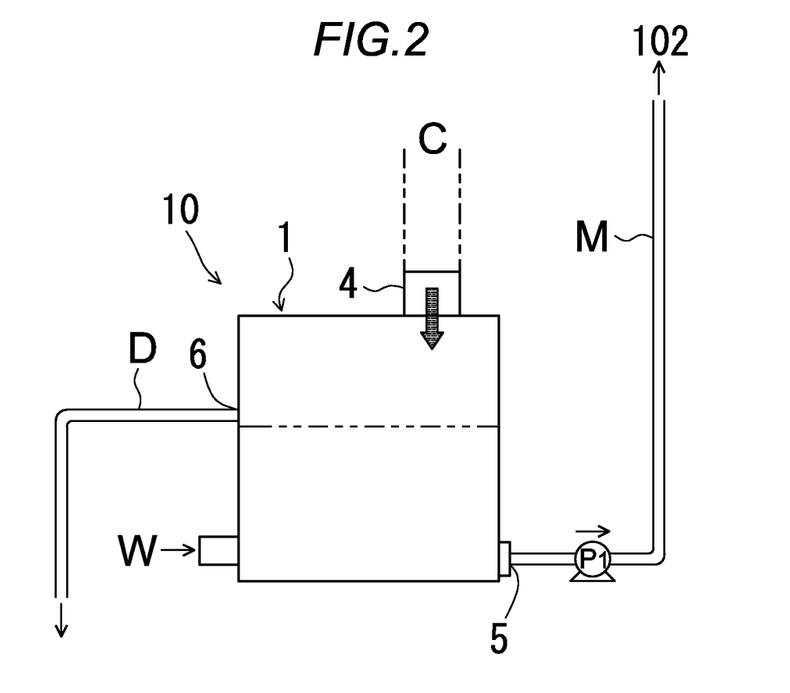
FIG. 2 is a diagram for explaining a configuration of a condensate water recovery device, a reforming water supply flow path, and an excess water flow path in the fuel cell device according to the first non-limiting embodiment.

The condensate water stored in the condensate water recovery device 10 is supplied to the reformer 102 through the reforming water pump P1 and a reforming water supply flow path M, and is used for steam-reforming of the raw fuel. The condensate water recovery device 10 introduces external water such as tap water through an external water introduction flow path W or the like. The exhaust gas is delivered to outside the fuel cell system through an exhaust gas flow path E.

Figure 3:
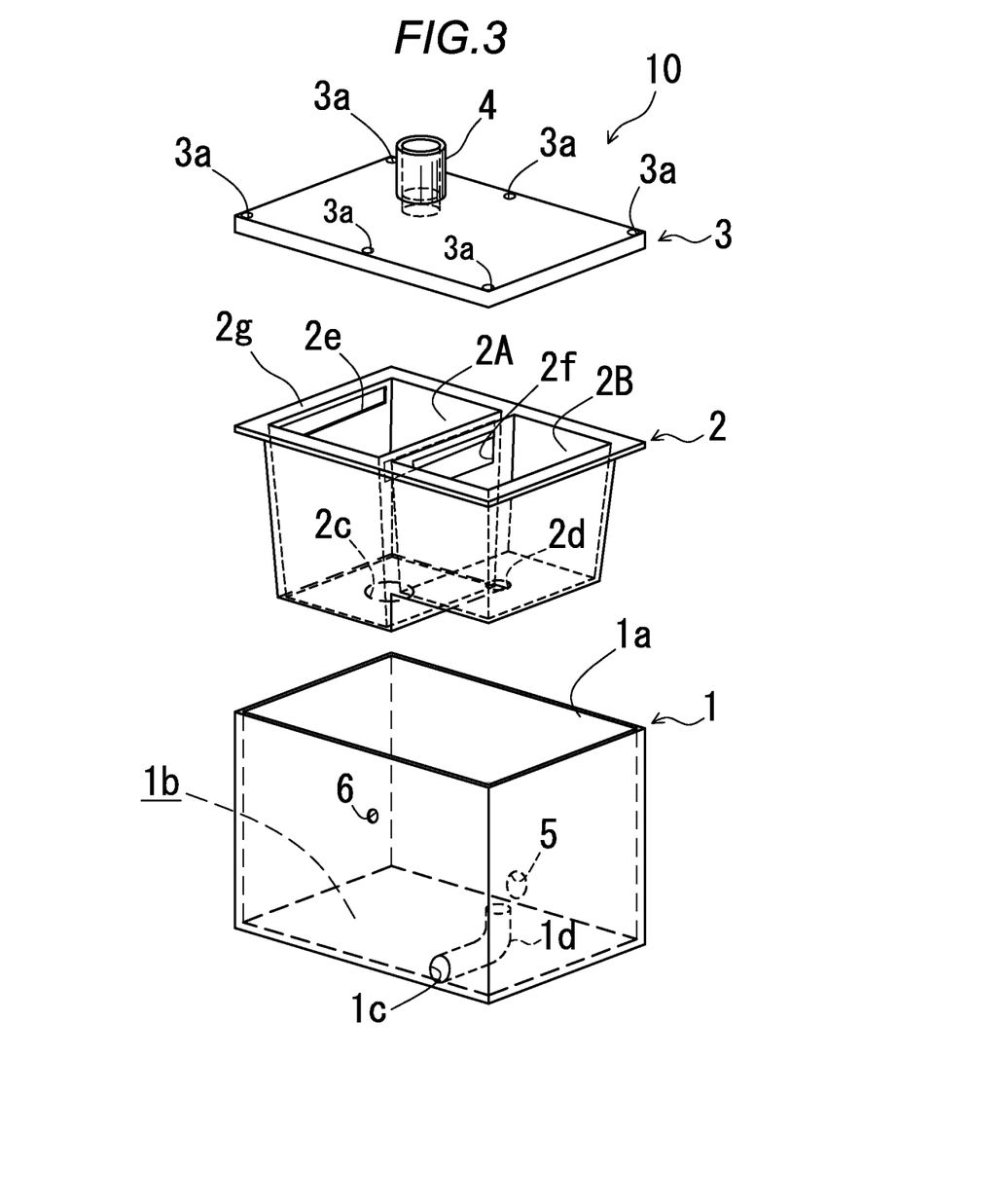
FIG. 3 is an exploded perspective view illustrating a configuration of the condensate water recovery device in the fuel cell device according to the first non-limiting embodiment.
Figure 4:
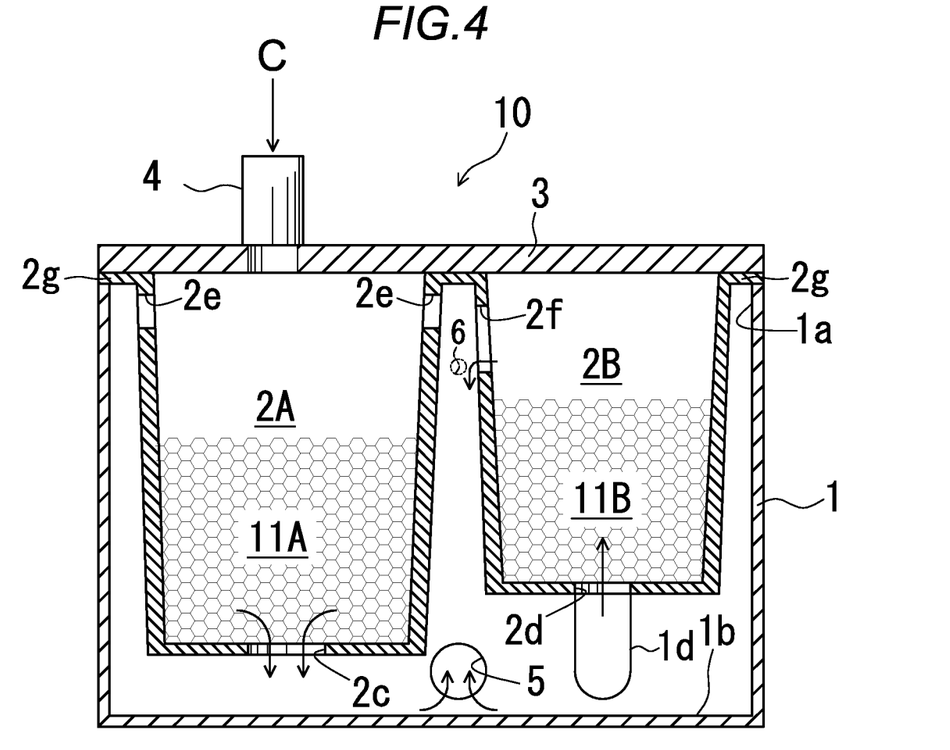
FIG. 4 is a cross-sectional view illustrating the configuration of the condensate water recovery device illustrated in FIG. 3.

FIG. 3 is an exploded perspective view illustrating a configuration of a condensate water recovery device 10 in the fuel cell device according to the first non-limiting embodiment, and FIG. 4 is a cross-sectional view illustrating the condensate water recovery device 10 illustrated in FIG. 3.

As illustrated in the exploded perspective view of FIG. 3, the condensate water recovery device 10 includes a first storage container 1, an ion exchange resin container 2 including a first ion exchange container 2A and a second ion exchange container 2B, and a cover 3 that covers the first storage container 1. In FIG. 3, illustration of ion exchange resins for treating the condensate water and purifying the external water filled in the first ion exchange container 2A and the second ion exchange container 2B is omitted.

As illustrated in the exploded perspective view of FIG. 3, the first storage container 1 is a bottomed box-shaped container that is open largely on an upper side (see the upper side opening 1a). The recessed space thereinside serves as a storage portion 1b that stores the reforming water after the purification treatment. As illustrated in the cross-sectional view of FIG. 4, when the ion exchange resin container 2 or the first ion exchange container 2A, which will be described below, is installed inside the first storage container 1, the ion exchange resin container 2 is disposed with a space from the first storage container 1. As a result, the reforming water after the purification treatment may be directly stored inside the first storage container 1.

The ion exchange resin container 2 may be removable from the upper side opening 1a described above with respect to the first storage container 1. That is, with this configuration, the fuel cell device according to the non-limiting embodiment may allow the ion exchange resin container 2 or the first ion exchange container 2A containing the ion exchange resin 11A to be easily attached to and detached from the first storage container 1. Therefore, the fuel cell device according to the first non-limiting embodiment may be excellent in maintainability.

An opening at a top of the first ion exchange container 2A is a vent hole 2e through which the first ion exchange container 2A and the first storage container 1 communicate with each other. The first storage container 1 includes a reforming water outlet 5 formed on a side or on one surface of a side wall thereof (on a back side in the illustration of FIG. 3) for sending the stored reforming water to the reforming water supply flow path M.

In the following description, an exit port or outlet serving as a start end of the reforming water supply flow path M is referred to as a reforming water outlet 5. In each of the following non-limiting embodiments, the container provided with the reforming water outlet 5 may differ.

An excess water outlet 6 is provided on a front side of the first storage container 1, which is a side at the front of the illustration of FIG. 3, to discharge excess reforming water (hereinafter, excess water) after the storage portion 1b is full. An excess water flow path D which is a drain flow path is connected to this excess water outlet 6.

It should be noted that, in the following description, an outlet serving as a start end of the excess water flow path D is referred to as the excess water outlet 6. In each of the following non-limiting embodiments, the container provided with the excess water outlet 6 may differ.

An external water receiving port 1c which receives tap water or the like fed from a water supply or the like into the container is provided on the front side of the first storage container 1. Then, on the back side inside the external water receiving port, an extended pipe 1d which communicates between the external water receiving port 1c and an external water introduction port 2d of the second ion exchange container 2B to be described below, is provided.

In a non-limiting embodiment, the ion exchange resin container 2 is divided into two blocks by a partition part or partition wall near the center. In the drawing, the larger and deeper block in the back side is the first ion exchange container 2A, and the relatively smaller block in the front side is the second ion exchange container 2B. It should be noted that the ion exchange resin container 2 may be integrally formed using a resin or the like.

With such configuration, without having to store two types of, or two ion exchange resins separately, it is possible to store in the first storage container 1 in a compact manner. The ion exchange resins separately accommodated in the first ion exchange container 2A and the second ion exchange container 2B are exchanged simultaneously and at once. Therefore, the fuel cell device according to the first non-limiting embodiment may be excellent in maintainability.

The first ion exchange container 2A on the back side is a portion through which condensate water recovered from the heat exchanger 103 of the fuel cell module 100 mainly flows. The inside is filled with ion exchange resin (11A, not illustrated in FIG. 3) for treating condensate water. On a lower side of a bottom of the first ion exchange container 2A, there is a treated water exit port 2c through which treated water treated with the ion exchange resin 11A flows down and is discharged toward the storage portion 1b. The treated water exit port 2c is an example of a first water supply port in a non-limiting aspect of the disclosure.

The second ion exchange container 2B on the front side is for purifying the external water such as tap water introduced from the external water introduction port 2*d* at the bottom described above. The inside is filled with an ion exchange resin (11B, not illustrated in FIG. 3) for purifying the external water. Conversely to the first ion exchange container 2A described above in which the condensate water flows down from the top to the bottom, in the second ion exchange container 2B, the tap water flowing from below flows upward, and the treated purified water overflows from a purified water outlet 2*f* provided at the upper portion, which is a second water supply port according to a non-limiting aspect of the disclosure, and flows down toward the storage portion 1*b*. The second ion exchange container 2B is a part of the external water introduction flow path W which introduces external water such as tap water into the condensate water recovery device 10.

As described above, by providing the second ion exchange container 2B in addition to the storage portion 1*b*, when the amount of condensate water in the storage portion 1*b* is reduced, external water such as tap water may be supplied from the second ion exchange container 2B to the storage portion 1*b*. When the fuel cell device is started, purified external water may be stored in advance in the storage portion 1*b* as reforming water from the second ion exchange container 2B.

Meanwhile, in the related art, when treating the external water and the condensate water with the same ion exchange resin, since external water contains many impurities, there is a possibility of shortening the lifetime of the ion exchange resin that is originally intended for use in treating condensate water. Meanwhile, in a non-limiting embodiment, since the ion exchange resin 11B for purifying external water is provided separately from the ion exchange resin 11A for treating condensate water, the tap water or the like that is expected to contain a large amount of impurities does not flow through the ion exchange resin 11A for treating condensate water. Therefore, the lifetime of the ion-exchange resin 11A for treating condensate water described above may be extended as compared with the related art.

Note that, for example, when external water is not required, the first storage container 1 does not need to include the second ion exchange container 2B therein, and the first storage container 1 may have a structure that includes only the first ion exchange container 2A therein. Even when external water is required, the second ion exchange container 2B may still be provided outside the first storage container 1.

When the first storage container 1 has a structure that includes only the first ion exchange container 2A therein, the first storage container 1 can be compact-sized as compared with the case of further including the second ion exchange container 2B. Even when the second ion exchange container 2B is provided in addition to the first ion exchange container 2A, the second ion exchange container 2B does not necessarily have to be formed into a single body with the first ion exchange container 2A. When these are separately provided, it is possible to easily replace only one ion exchange resin that has expired its lifetime at each timing.

The cover 3 of the condensate water recovery device 10 is formed in such a size that covers the entire upper side opening 1*a* of the first storage container 1 that is largely open. The cover 3 is provided with a condensate water introduction port 4 through which condensate water recovered from the heat exchanger 103 flows, and perforations 3*a* used for the purpose of fixing the cover 3, such as screw fixing, or the like, respectively. Since the cover 3 is fixed to the first storage container 1 by screw fixing or the like, it may be easily removed during maintenance.

Figure 5:
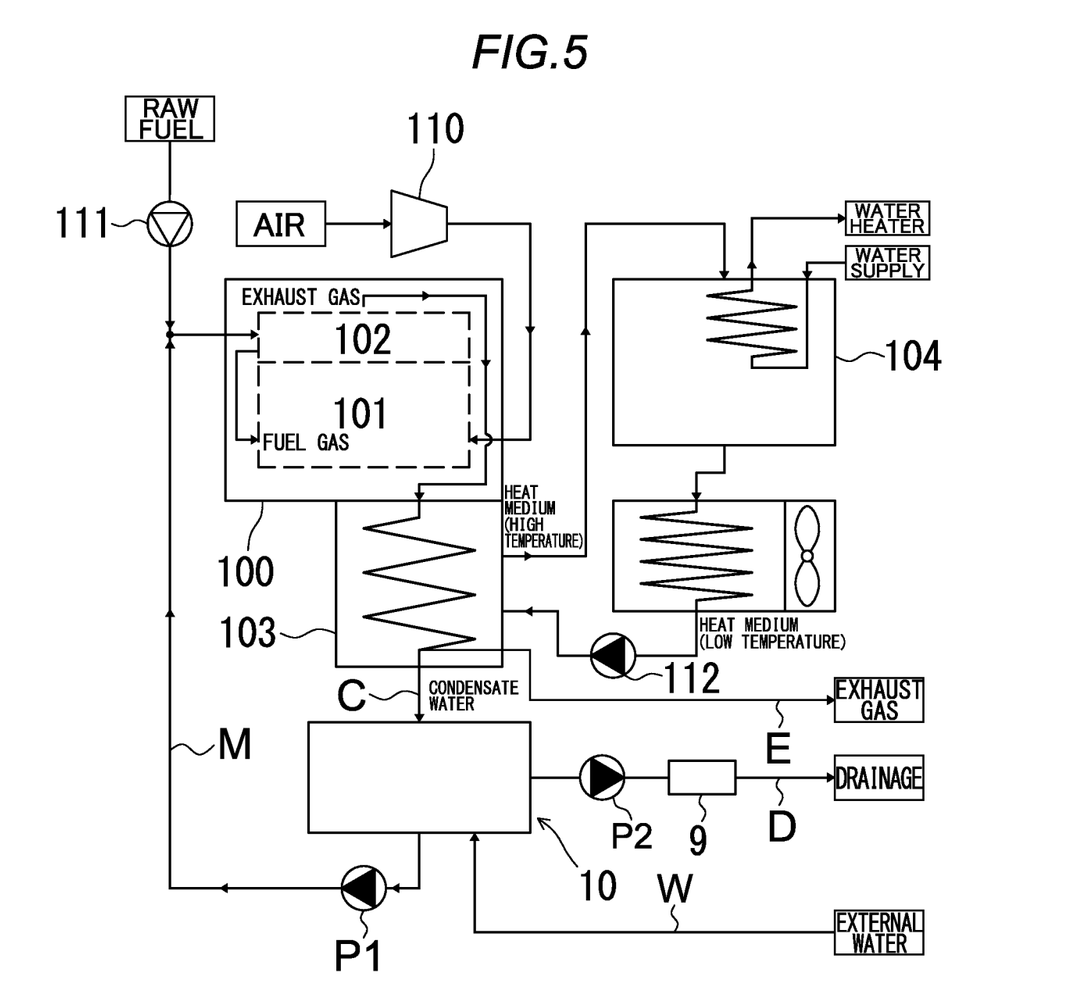
FIG. 5 is a diagram illustrating a schematic configuration of a fuel cell device according to a second non-limiting embodiment.
Figure 6:
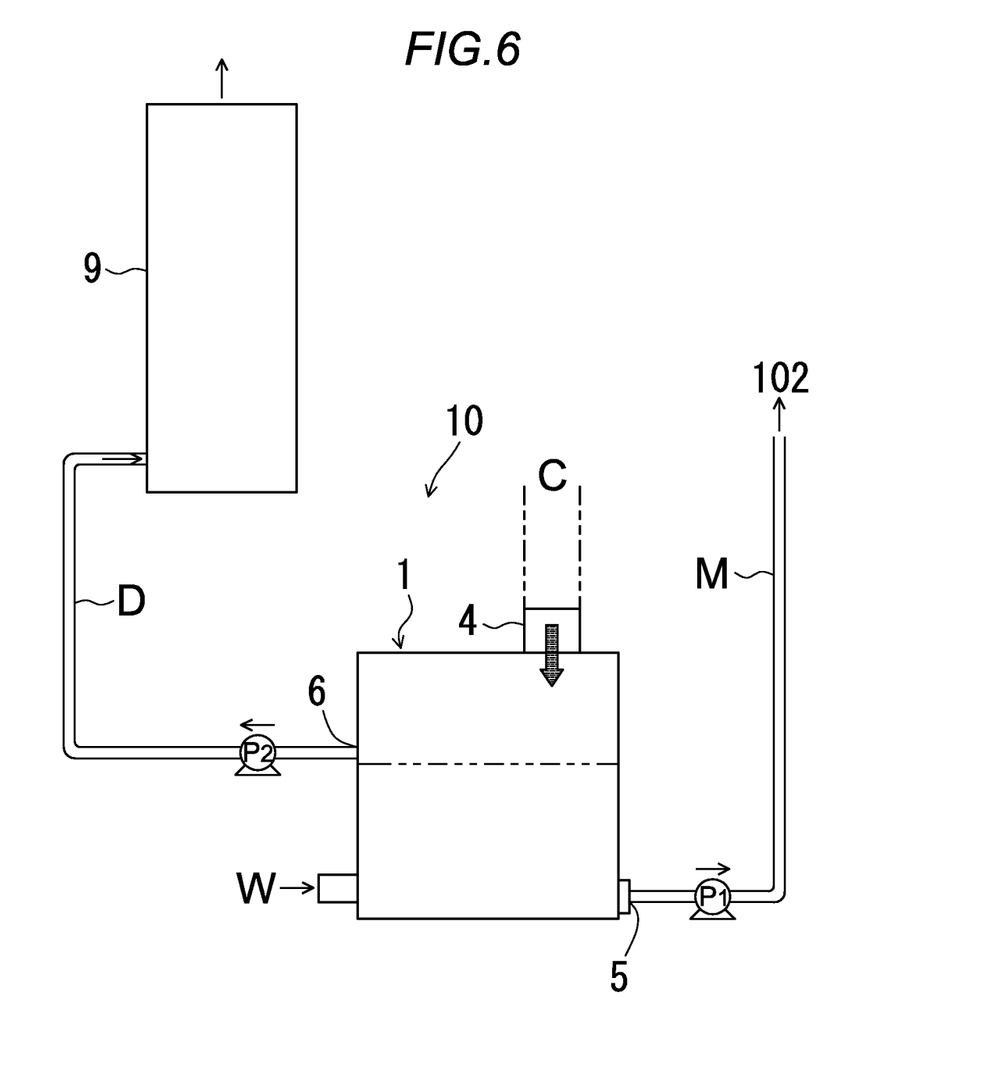
FIG. 6 is a diagram for explaining a configuration of a condensate water recovery device, a reforming water supply flow path, and an excess water flow path in the fuel cell device according to the second non-limiting embodiment.
Figure 7:
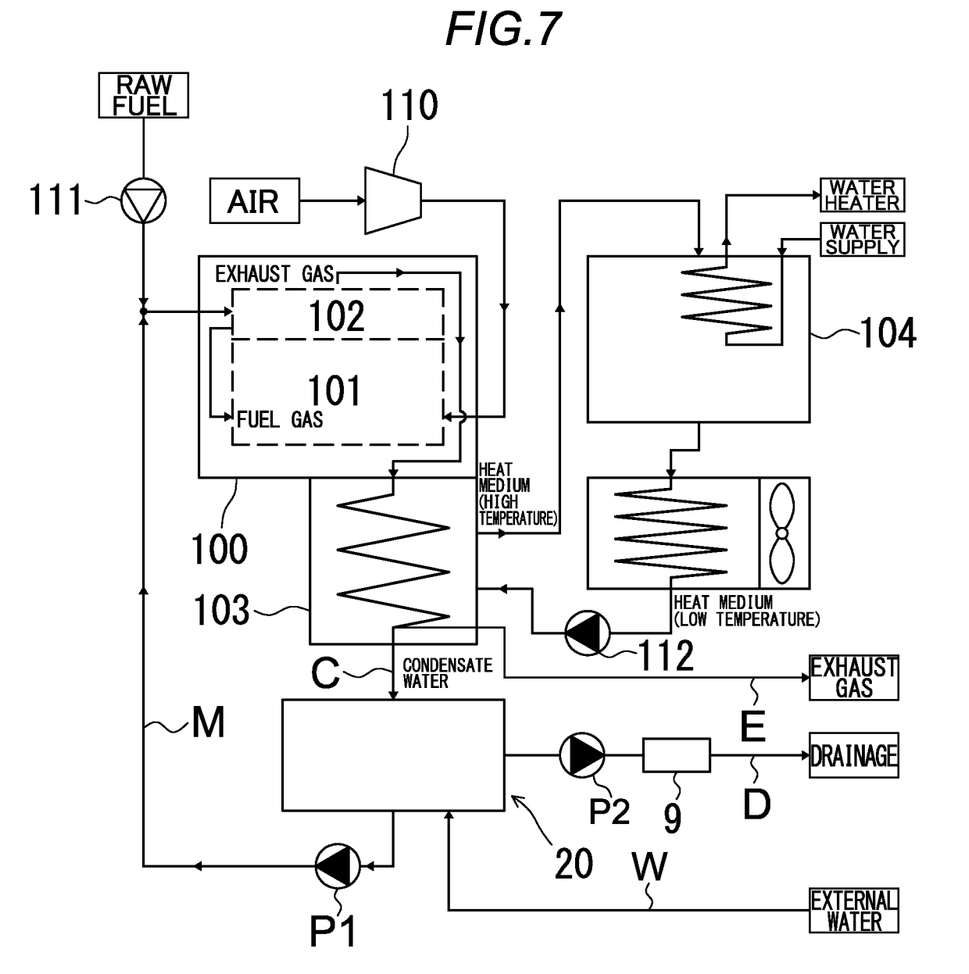
FIG. 7 is a diagram illustrating a schematic configuration of a fuel cell device according to a third non-limiting embodiment.

Next, FIGS. 5 and 6 are diagrams for explaining a configuration of a fuel cell device according to a second non-limiting embodiment. The fuel cell device according to the second non-limiting embodiment is different from the fuel cell device according to the first non-limiting embodiment illustrated in FIGS. 1 and 2 in that the excess water flow path D which discharges excess water, which is excess in the condensate water recovery device 10, is provided with a neutralization container 9 that contains a neutralizer and an excess water pump P2 that pumps excess water to the neutralization container 9. As described above, the neutralization container 9 may be provided when pH adjustment of excess water is required for draining outside the device.

With such configuration, the excess water is pumped to the neutralization container 9 on the downstream by the excess water pump P2 on the upstream of the neutralization container 9, so that the neutralizer in the neutralization container 9 flows into the excess water pump P2, thereby preventing the excess water pump P2 from being clogged. As illustrated in FIG. 6, when the neutralization container 9 is located above the excess water pump P2, a backflow prevention member, such as a check valve, may be disposed in the middle of the excess water flow path D in order to prevent the backflow of drainage from the neutralization container 9 to the excess water pump P2.

Figure 8:
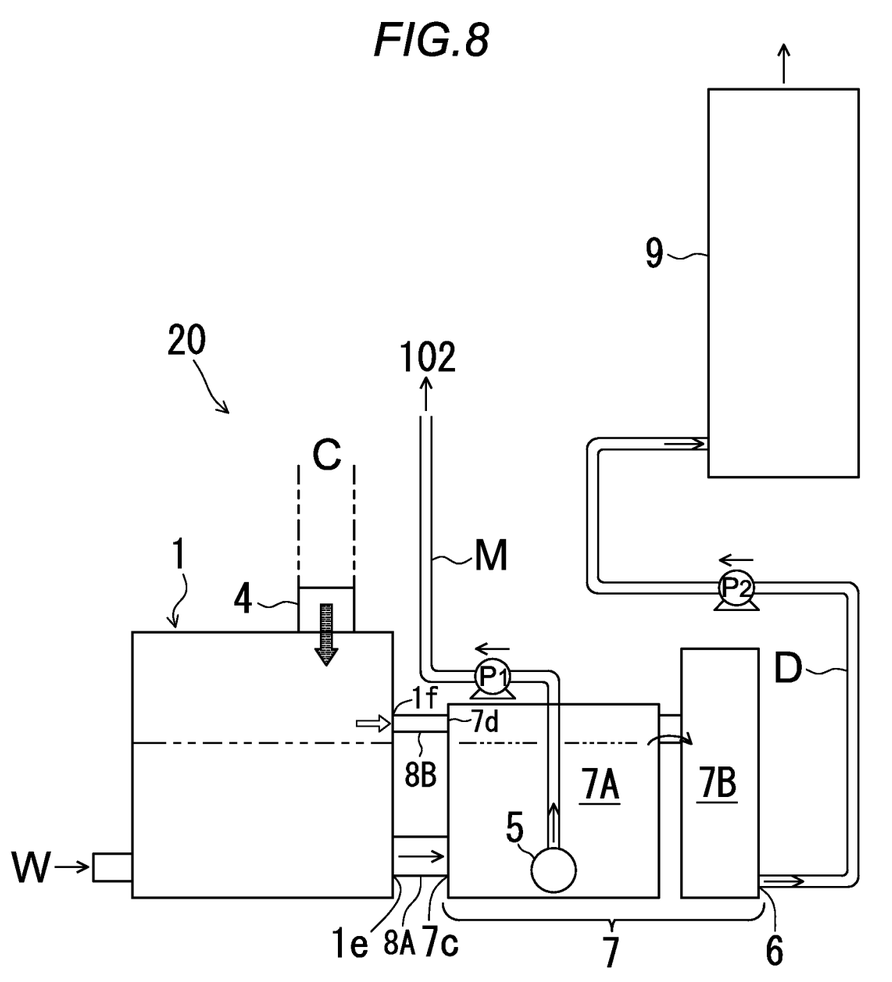
FIG. 8 is a diagram for explaining a configuration of a condensate water recovery device, a reforming water supply flow path, and an excess water flow path in the fuel cell device according to the third non-limiting embodiment.

Next, FIGS. 7 to 10 are diagrams for explaining a configuration of a fuel cell device of a third non-limiting embodiment. The condensate water recovery device 20 in the fuel cell device according to this non-limiting embodiment may be different from the condensate water recovery device 10 of the first and second non-limiting embodiments, in that, as illustrated in FIG. 8, a second storage container 7 (also referred to as a sub-tank) that communicates with the first storage container 1 is provided, and an upstream end of the reforming water supply channel M (the reforming water outlet 5 that is the start end) is provided in the second storage container 7. As described above in FIGS. 1 and 6, the reference symbol P1 is the reforming water pump, the reference symbol P2 is the excess water pump, C is the condensate water recovery flow path, D is the excess water flow path, M is the reforming water supply flow path, W is the external water introduction flow path, and the reference numeral 9 is the neutralization container.

The first storage container 1 and the second storage container 7 are connected to each other by a water connection pipe 8A between a lower reforming water exit port 1*e*, which is a third water supply port in a non-limiting aspect of the disclosure, and a water receiving port 7*c*.

At an upper portion between the first storage container 1 and the second storage container 7, an air connection pipe 8B is disposed in communication between an air outlet 1*f* and an air inlet 7*d* disposed to face each other.

The second storage container 7 (sub-tank) will be described in detail.

The second storage container 7 includes a first tank 7A that stores the reforming water that is purified, and a second tank 7B that stores the excess water that is overflowed from a full water line of the first tank 7A indicated by a two-dot chain line in the drawing.

The first tank 7A is communicated with the first storage container 1 through the water connection pipe 8A described above at a lower portion that corresponds to the underwater portion, and upper spaces of the first tank 7A and the first storage container 1 are in communication with each other through the air connection pipe 8B. As a result, the level of the water surface in the first tank 7A and the level of the water surface in the first storage container 1, that is, the water levels are the same as each other.

An upstream end, which is the start end of the reforming water supply flow path M described above, is connected to the reforming water outlet 5 provided in the vicinity of the bottom at the lower portion of the first tank 7A. An upstream end, which is the start end of the excess water flow path D described above, is connected to the excess water outlet 6 of the second tank 7B that stores the excess water. With such configuration, it is possible to immediately start using the stored reforming water without waiting for the water stored in the first storage container 1 to be full.

Meanwhile, in order to stably maintain the water self-sustained operation of the fuel cell device, an amount of stored reforming water according to the power generation capacity is required. Therefore, in the related fuel cell device, the capacity or volume of the first storage container 1 which requires maintenance tends to increase.

However, in the fuel cell device according to a non-limiting embodiment, due to the presence of the second storage container 7 having the first tank 7A, the required amount of stored water may be allocated to the first tank 7A, which is a second storage portion, without greatly increasing the capacity and volume of the first storage container 1 which requires maintenance. Therefore, the first storage container 1 which requires maintenance may be reduced in size compared with the case where there is no sub-tank, and maintenance is facilitated. As a result, the maintainability of the entire fuel cell device is improved.

Figure 9:
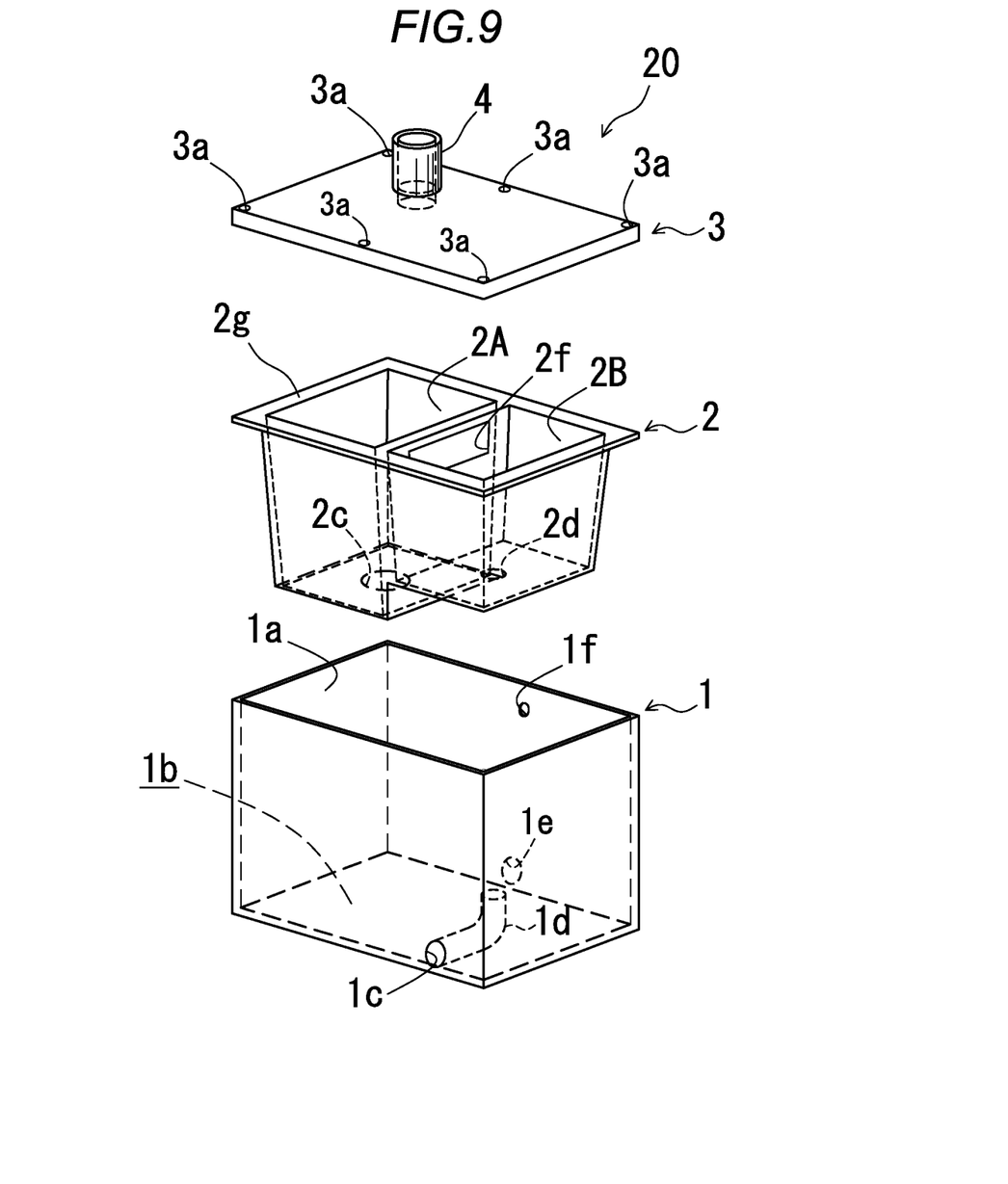
FIG. 9 is an exploded perspective view illustrating a configuration of the condensate water recovery device in the fuel cell device according to the third non-limiting embodiment.
Figure 10:
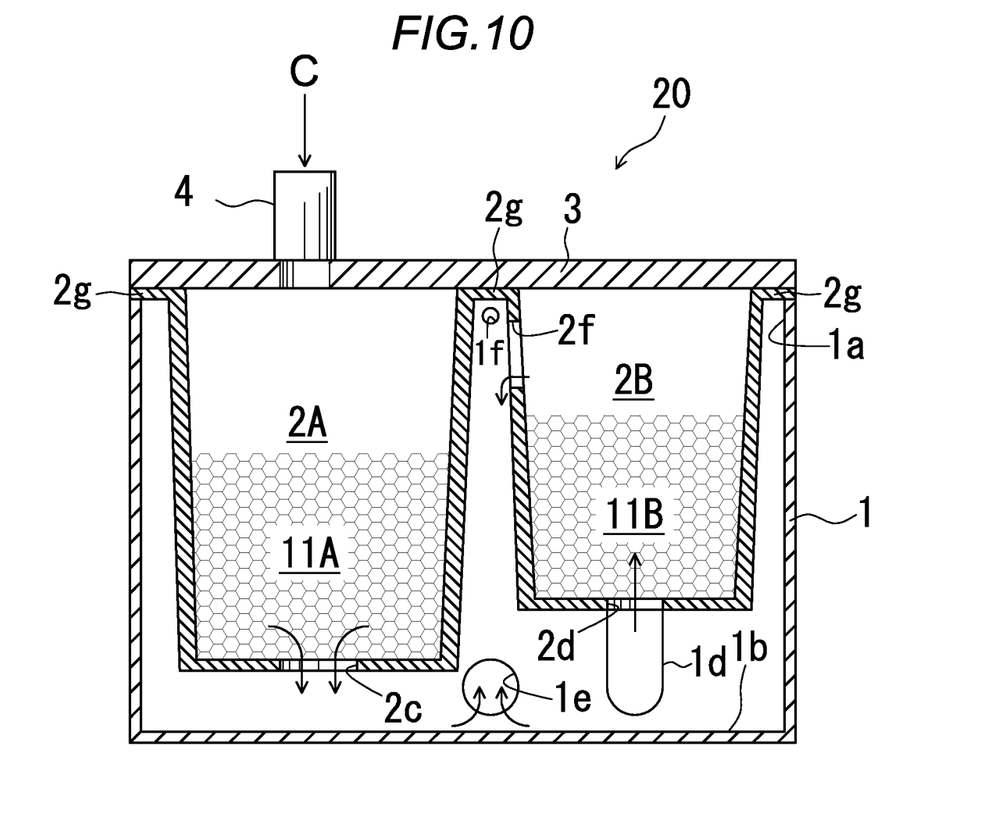
FIG. 10 is a cross-sectional view illustrating the configuration of the condensate water recovery device illustrated in FIG. 9.

Meanwhile, in the fuel cell device according to the third non-limiting embodiment, attention is invited to the configuration of the main body of the condensate water recovery device 20, in which, as illustrated in FIGS. 9 and 10, the first ion exchange container 2A is inserted into the first storage container 1, with its upper end 2g being interposed and sealed between the cover 3 and an upper end of the first storage container 1 over the entire circumference. Unlike the condensate water recovery device 10 according to the first non-limiting embodiment, opening such as the vent hole 2e is not provided, which communicates the inside of the first ion exchange container 2A and the internal space of the first storage container 1 therearound.

That is, in the first storage container 1 according to the third non-limiting embodiment, the condensate water introduction port 4 connected to the condensate water recovery channel C and the heat exchanger 103 is not in direct communication with the internal space of the first storage container 1 around the first ion exchange container 2A described above, while the atmospheric pressure is linked only through the treated water exit port 2c, which is the first water supply port of the bottom at the lower portion of the first ion exchange container 2A. In other words, the first ion exchange container 2A is disposed so that the condensate water recovery flow path C and the upper side opening 1a of the first storage container 1 are not in communication with each other.

This is due to the following reason. That is, when strong outdoor wind blows into the exhaust gas flow path E, the exhaust gas may flow backward in the exhaust gas flow path E. In this case, since the upstream of the exhaust gas flow path E is connected to the condensate water recovery flow path C, the backflow of exhaust gas flows into the condensate water recovery device 10 or 20 through the condensate water recovery flow path C. Since the backflow of exhaust gas contains nitric acid or the like, after the purification treatment, when the nitric acid or the like in these exhaust gases is dissolved in the reforming water stored in the first storage container 1 around the first ion exchange container 2A, the purified reforming water will be contaminated. As in the configuration described above, by blocking communication between the condensate water recovery flow path C and the upper side opening 1a of the first storage container 1, recontamination of the purified reforming water due to the exhaust gas flowing backward as described above may be prevented in advance.

On the other hand, the water surface of the stored reforming water may be pushed down by the wind pressure of the wind blowing from the exhaust gas flow path E and passing through the condensate water recovery flow path C. In this case, there is a possibility that the reforming water in the first storage container 1 passes through the water connection pipe 8A and is pushed out toward the second storage container 7 to raise the water level of the first tank 7A, possibly resulting in even reforming water being discharged to the second tank 7B.

Even in this case, as described above, by disposing the first ion exchange container 2A so that the condensate water recovery flow path C and the upper side opening 1a of the first storage container 1 are not in communication with each other, this problem may be solved. That is, with the configuration described above, since only the water surface in the first ion exchange container 2A communicating with the condensate water recovery flow path C is pushed down by the wind pressure, and the ion exchange resin 11A is accommodated in the first ion exchange container 2A, the amount of water in the first ion exchange container 2A is smaller than the amount of water in the first storage container 1. Therefore, when the water surface is pushed down, it results only a small amount of water being discharged, and accordingly, the reforming water inside the first storage container 1 is not discharged unnecessarily and ensured to be in an appropriate amount.

As described above, the first storage container 1 and the second storage container 7 are communicated with each other at the upper portions thereof by the air connection pipe 8B disposed between the air outlet 1f and the air inlet 7d. With such configuration, when the reforming water is stored in the first storage container 1 and the water level rises, air by that volume flows into the second storage container 7 through the air connection pipe 8B. That is, the first storage container 1 and the second storage container 7 communicate with each other at the upper portions thereof, so that even when the first storage container 1 is not in communication with the condensate water recovery flow path C, a sufficient amount of reforming water may be stored in the first storage container 1 without being influenced by the wind pressure described above.

As described above, although non-limiting embodiments of the disclosure have been described in detail, the disclosure is not limited to the non-limiting embodiments described above, and various changes, improvements, or the like may be realized without departing from the scope according to the disclosure.

For example, the shape of each storage container 1, 7 and the neutralization container 9 is not limited to the box shape, and may be other shapes. These arrangements may also vary in any manner including the vertical positions relative to each other.

The disclosure may be embodied in other specific forms without departing from the spirit or essential characteristics thereof. The present non-limiting embodiments are therefore to be considered in all respects as illustrative and not restrictive, the scope of the disclosure being indicated by the appended claims rather than by the foregoing description and all changes which come within the meaning and the range of equivalency of the claims are therefore intended to be embraced therein.

REFERENCE SIGNS LIST

1: First storage container
1a: Upper side opening
1b: Storage portion
2: Ion exchange resin container
2A: First ion exchange container
2B: Second ion exchange container
7: Second storage container
7A: First tank
7B: Second tank
9: Neutralization container
10, 20: Condensate water recovery device
11A, 11B: Ion exchange resin

What is claimed is:

1. A fuel cell device, comprising:
a fuel cell module comprising a fuel cell and a reformer configured to steam-reform a raw fuel;
a condensate water recovery flow path configured to recover water contained in an exhaust gas discharged from the fuel cell module as condensate water;
a condensate water recovery device configured to store the condensate water flowing through the condensate water recovery flow path,
the condensate water recovery device comprising:
a first ion exchange container which contains an ion exchange resin,
a first storage container configured to store the condensate water having passed through the first ion exchange container, and
a second storage container communicating with the first storage container; and
a reforming water supply flow path configured to supply the condensate water from the first storage container of the condensate water recovery device to the reformer;
wherein
the first storage container is a bottomed container comprising an upper side opening;
the first ion exchange container is disposed inside the first storage container with a space from the first storage container, and is configured to attach to and detach from the first storage container through the upper side opening;
an upstream end of the reforming water supply flow path is connected to the second storage container;
the first storage container comprises, at a lower portion thereof, a reforming water exit port configured to discharge the condensate water therein toward the second storage container;
the second storage container comprises, at a lower portion thereof, a water receiving port configured to receive the condensate water inside the first storage container; and
the reforming water exit port and the water receiving port are connected to each other by a connection pipe.

2. The fuel cell device according to claim 1, wherein
the first ion exchange container comprises, at a lower portion thereof, a first water supply port configured to discharge the condensate water having passed through the first ion exchange container;
the first ion exchange container is disposed with a space from a bottom surface of the first storage container; and
the space is a storage portion configured to store the condensate water supplied from the first water supply port.

3. The fuel cell device according to claim 1, wherein
the condensate water recovery device comprises:
an external water introduction flow path configured to introduce external water supplied from outside, and
a second ion exchange container which contains a second ion exchange resin;
a downstream end of the external water introduction flow path is connected to the first storage container; and
the second ion exchange container is disposed as part of the external water introduction flow path.

4. The fuel cell device according to claim 3, wherein
the second ion exchange container is disposed inside the first storage container, and is configured to attach to and detach from the first storage container through the upper side opening;
the downstream end of the external water introduction flow path is connected to a lower portion of the second ion exchange container; and
the second ion exchange container comprises, at an upper portion thereof, a second water supply port configured to discharge toward the storage portion, the external water having passed through the second ion exchange container.

5. The fuel cell device according to claim 4, wherein
the second ion exchange container and the first ion exchange container are integrated.

6. The fuel cell device according to claim 1, further comprising:
a neutralization container which contains a neutralizer;
an excess water flow path configured to discharge excess water that is excess in the condensate water recovery device, from the neutralization container externally out of the fuel cell device; and
an excess water pump configured to pump the excess water to the neutralization container through the excess water flow path.

7. The fuel cell device according to claim 1, wherein
in the first ion exchange container, the condensate water recovery flow path is not in communication with the upper side opening of the first storage container;
the first storage container comprises an air outlet configured to vent air therein to the second storage container, at an upper portion of the first storage container;
the second storage container comprises an air inlet configured to introduce the air inside the first storage container thereto; and
the air outlet and the air inlet are connected to each other by a connection pipe.

8. The fuel cell device according to claim 1, further comprising:
a neutralization container which contains a neutralizer, wherein
the second storage container comprises:
a first tank configured to store reforming water supplied to the reformer, and
a second tank configured to store excess water overflowed from the first tank;
an excess water flow path configured to discharge excess water that is excess in the condensate water recovery device, from the neutralization container externally out of the fuel cell device;
an upstream end of the reforming water supply flow path is connected to the first tank; and an upstream end of the excess water flow path is connected to the second tank.

9. A fuel cell device, comprising:
a fuel cell module comprising a fuel cell and a reformer configured to steam-reform a raw fuel;
a condensate water recovery flow path configured to recover water contained in an exhaust gas discharged from the fuel cell module as condensate water;
a condensate water recovery device configured to store the condensate water flowing through the condensate water recovery flow path,
the condensate water recovery device comprising:
 a first ion exchange container which contains an ion exchange resin,
 a first storage container configured to store the condensate water having passed through the first ion exchange container,
 an external water introduction flow path configured to introduce external water supplied from outside, and
 a second ion exchange container which contains a second ion exchange resin; and
a reforming water supply flow path configured to supply the condensate water from the first storage container of the condensate water recovery device to the reformer;
wherein
the first storage container is a bottomed container comprising an upper side opening,
the first ion exchange container is disposed inside the first storage container with a space from the first storage container, and is configured to attach to and detach from the first storage container through the upper side opening,
a downstream end of the external water introduction flow path is connected to the first storage container, and
the second ion exchange container is disposed as part of the external water introduction flow path.

10. The fuel cell device according to claim 9, wherein
the first ion exchange container comprises, at a lower portion thereof, a first water supply port configured to discharge the condensate water having passed through the first ion exchange container;
the first ion exchange container is disposed with a space from a bottom surface of the first storage container; and
the space is a storage portion configured to store the condensate water supplied from the first water supply port.

11. The fuel cell device according to claim 9, wherein
the second ion exchange container is disposed inside the first storage container, and is configured to attach to and detach from the first storage container through the upper side opening;
the downstream end of the external water introduction flow path is connected to a lower portion of the second ion exchange container; and
the second ion exchange container comprises, at an upper portion thereof, a second water supply port configured to discharge toward the storage portion, the external water having passed through the second ion exchange container.

12. The fuel cell device according to claim 9, wherein
the second ion exchange container and the first ion exchange container are integrated.

13. The fuel cell device according to claim 9, further comprising:
a neutralization container which contains a neutralizer;
an excess water flow path configured to discharge excess water that is excess in the condensate water recovery device, from the neutralization container externally out of the fuel cell device; and
an excess water pump configured to pump the excess water to the neutralization container through the excess water flow path.

14. The fuel cell device according to claim 9, further comprising:
a second storage container communicating with the first storage container,
wherein
an upstream end of the reforming water supply flow path is connected to the second storage container.

15. The fuel cell device according to claim 14, wherein
the first storage container comprises, at a lower portion thereof, a reforming water exit port configured to discharge the condensate water therein toward the second storage container;
the second storage container comprises, at a lower portion thereof, a water receiving port configured to receive the condensate water inside the first storage container; and
the reforming water exit port and the water receiving port are connected to each other by a connection pipe.

16. The fuel cell device according to claim 15, wherein
in the first ion exchange container, the condensate water recovery flow path is not in communication with the upper side opening of the first storage container;
the first storage container comprises an air outlet configured to vent air therein to the second storage container, at an upper portion of the first storage container;
the second storage container comprises an air inlet configured to introduce the air inside the first storage container thereto; and
the air outlet and the air inlet are connected to each other by a connection pipe.

17. The fuel cell device according to claim 14, further comprising:
a neutralization container which contains a neutralizer,
wherein
the second storage container comprises:
a first tank configured to store reforming water supplied to the reformer, and
a second tank configured to store excess water overflowed from the first tank;
an excess water flow path configured to discharge excess water that is excess in the condensate water recovery device, from the neutralization container externally out of the fuel cell device;
an upstream end of the reforming water supply flow path is connected to the first tank; and
an upstream end of the excess water flow path is connected to the second tank.

* * * * *